United States Patent
Gibson

(10) Patent No.: US 9,937,958 B2
(45) Date of Patent: Apr. 10, 2018

(54) MOBILE VEHICLE TRAILER APPARATUS

(71) Applicant: William Gibson, Ashley, IN (US)

(72) Inventor: William Gibson, Ashley, IN (US)

( * ) Notice: Subject to any disclaimer, the term of this patent is extended or adjusted under 35 U.S.C. 154(b) by 0 days.

(21) Appl. No.: 15/044,405

(22) Filed: Feb. 16, 2016

(65) Prior Publication Data

US 2017/0233006 A1    Aug. 17, 2017

(51) Int. Cl.
*B62D 21/20* (2006.01)
*B62D 63/06* (2006.01)

(52) U.S. Cl.
CPC ........... *B62D 21/20* (2013.01); *B62D 63/062* (2013.01)

(58) Field of Classification Search
CPC ............................. B62D 21/20; B62D 53/061
See application file for complete search history.

(56) References Cited

U.S. PATENT DOCUMENTS

| 3,892,423 A * | 7/1975 | Smith | B62D 53/061 |
| | | | 280/423.1 |
| 4,261,594 A * | 4/1981 | Corbett | B60D 1/07 |
| | | | 280/417.1 |
| 4,762,192 A * | 8/1988 | Maxwell | B60P 3/40 |
| | | | 180/14.2 |
| 5,924,829 A * | 7/1999 | Hastings | B62D 53/061 |
| | | | 280/DIG. 8 |
| 6,210,088 B1 * | 4/2001 | Crosby | B60P 7/132 |
| | | | 410/35 |
| 7,775,529 B2 | 8/2010 | Kinkaide | |
| 7,926,618 B2 | 4/2011 | Zuercher | |
| 7,950,678 B1 | 5/2011 | Bauder | |
| 8,087,559 B2 | 1/2012 | Medina | |
| 8,113,526 B2 | 2/2012 | Longley | |
| 8,739,935 B2 | 6/2014 | Zuercher | |
| 8,919,049 B2 | 12/2014 | Meserini | |
| 2004/0070162 A1* | 4/2004 | Nelson | B60G 3/14 |
| | | | 280/149.1 |
| 2014/0217701 A1* | 8/2014 | Raemsch | B60P 3/42 |
| | | | 280/415.1 |
| 2015/0102568 A1 | 4/2015 | Slawson | |

* cited by examiner

*Primary Examiner* — James A English
(74) *Attorney, Agent, or Firm* — William Gibson

(57) ABSTRACT

A chassis for a vehicular trailer, comprising a generally flat wheel engaging segment, said wheel engaging rotatably attached to a pair of collinearly disposed wheels; a hitch engaging segment connected to a trailer hitch and a linking segment, said linking segment disposed between and connecting the wheel engaging segment and the hitch engaging segment and comprising a change in height adapted to cause the hitch engaging segment to be offset from the wheel engaging segment relative to a support surface.

2 Claims, 10 Drawing Sheets

SET

TRANSPORT

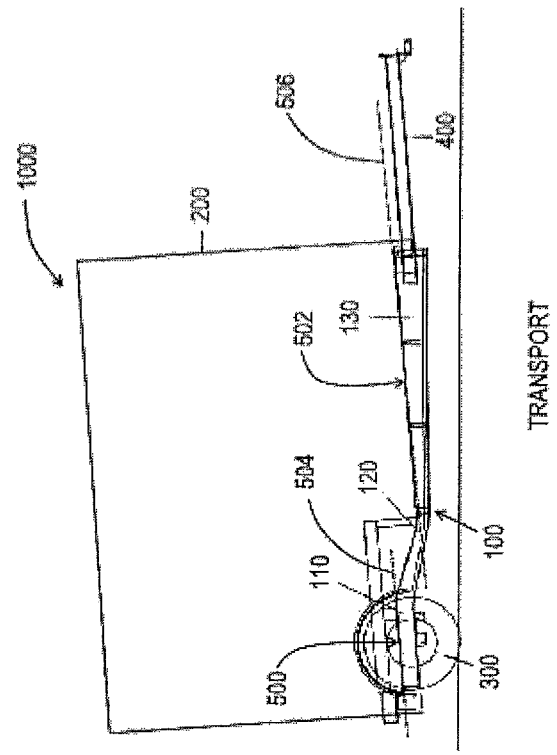
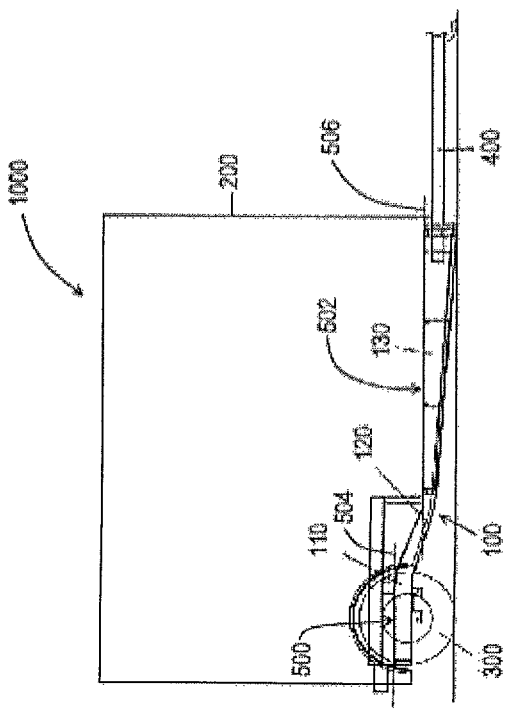

MOBILE VEHICLE TRAILER APPARATUS

BACKGROUND

1. Field of the Invention

The present invention relates to frames or chassis and, more particularly, to trailer chassis adapted to meet the needs of disabled users or other applications, wherein accessibility to the interior of an enclosed trailer or top of the deck of an open trailer is improved by having a lower point of access when not in transport mode.

2. Description of the Related Art

The present disclosure is directed to a trailer for transportation over a support surface such as a road. The trailer apparatus of the present invention is adapted to provide a trailer with significantly improved access in a deployed/standing (non-transport) position suitable for access by disabled users, preferably in compliance with the Americans with Disabilities Act ("ADA") or other applications where accessibility to the interior of an enclosed trailer or top of deck of an open trailer is improved by having a lower point of access when not in transport mode and a suitable transport position relative to ground clearances and typical industry "bumper pull" hitch connection heights of 15-25" found in vehicles with towing capacities less than 20,000 pounds.

Trailers are adapted to be attached to a vehicle typically by ball hitch, pintle hitch or $5^{th}$ wheel hitch for movement over a support surface from a first location to a desired second location. Trailers typically include a frame that is adapted to be removably attached to the vehicle when not in transport mode. The frame supports a floor and one or more axles are attached to the frame, with each axle having one or more rotatable wheels. The frame also often supports an enclosure that forms a useable interior space above the floor and that is typically accessible through one or more doors in the enclosure. The interior space within the enclosure may be used for various purposes, including the receipt and storage of goods for transport, commercial vending, bathroom facilities for use by individuals, or various types of work space or living space for use by individuals. When the interior space is adapted for use by individuals, it has been found advantageous to be able to lower the frame and thereby the floor of the trailer from a raised transport position to a lowered stationary position, wherein the floor and frame are lowered with respect to the wheels of the trailer and the support surface on which the trailer is located. Movement by an individual between the exterior of the trailer enclosure and the interior space of the trailer enclosure is simplified when the frame is in the lowered stationary position due to the lowered height of the frame and floor with respect to the support surface. The ability to lower the frame and floor of the trailer with respect to the wheels and thereby the support surface enables the trailer to more practically meet access requirements as established by the Americans with Disabilities Act ("ADA"). The frame also often supports an open deck for transport of payload that may be advantageous to load in a position that is lowered. Unfortunately, prior art trailers, as shown below, often fail to provide access to disabled persons or only do so by using complex suspension systems.

U.S. Pat. No. 775,529 discloses an independent adjustable axle suspension system for mounting a wheel to a frame of a trailer for transport of the trailer over a support surface. The axle suspension system includes a tower adapted to be attached to the frame and an axle unit adapted to receive the wheel. The tower is selectively moveable with respect to the axle unit along guide assemblies between extended and retracted positions to thereby selectively position the height of the frame with respect to the support surface.

U.S. Pat. No. 7,926,618 discloses a portable wheel chair lift device includes a lift car, a support base, and a lifting mechanism coupled thereto to selectively raise or lower the lift car while allowing the floor of the lift car to be fully-lowered to the ground surface. A scissors-like brace selectively locks the front door of the lift car to the support base when the lift car is elevated. The lift car floor can be folded and collapsed to a reduced width allowing transport through narrow. Transport casters are removably mounted to the bottom of the lift car to facilitate transport. The lift device includes a height adjustment control within the lift car to repeatedly raise the lift car to the height of a stage.

U.S. Pat. No. 7,950,678 discloses a trailer leveling system for adjusting a height of a frame of a trailer above a ground surface is disclosed. The trailer leveling system comprises at least one trailer leveling apparatus configured to adjust a distance between an axle of the trailer and the frame of the trailer. The at least one trailer leveling apparatus acts on a suspension of the trailer. The at least one trailer leveling apparatus moving the suspension between a traveling position and a leveling position, with the traveling position being characterized by the suspension being capable of supporting the frame during movement of the trailer along a road and the leveling position being characterized by a portion of the suspension being moved away from the frame with respect to the travel position.

U.S. Pat. No. 8,087,559 discloses a loading apparatus for allowing wheelchair access to a vehicle. The apparatus attaches to the hitch receiver of the vehicle, such as a van, truck or similar vehicle. The apparatus includes three ramp section pivotally connected such that the apparatus does not obstruct vision through the rear of the vehicle but also provides sufficient ground clearance for operation of the vehicle.

U.S. Pat. No. 8,113,526 discloses a suspension system having linearly translating load-bearing or load support members that confine displacement of a weight-bearing body or member to a longitudinal axis or displacement axis rather than a lateral axis or not coincident with the longitudinal axis, comprising a rail and bridge assembly. The linear bearing assembly can comprise a rail and a bridge slidably movable along the longitudinal axis of the rail.

U.S. Pat. No. 8,739,935 discloses a portable wheel chair lift device having a lift car, a support base, and a lifting mechanism coupled thereto to selectively raise or lower the lift car while allowing the floor of the lift car to be fully-lowered to the ground surface. The lift car floor can be folded and collapsed to a reduced width allowing transport through narrow passages. Transport casters are removably mounted to the bottom of the lift car to facilitate transport. The lift device includes a height adjustment control within the lift car to repeatedly raise the lift car to the height of a stage.

U.S. Pat. No. 8,919,049 discloses a prefabricated, transportable, ADA compliant, temporary addition, providing ADA accessible bathing, hygiene, and optional laundry facilities to the disabled occupants, eliminating the need to negotiate stairs to access a second floor bath or basement laundry. The addition is designed to be transported, lifted, connected and disconnected multiple times. The addition contains a walk-in shower with grab bars, ADA sink and sink base, tilt mirror, raised toilet with grab bars, egress door, light, heating unit, and exhaust fan. The addition is supported on a foundation of piers and attached to a ground floor room of an existing home by way of a connecting collar, minimizing the surface area connection to the house. The addition is pre-plumbed and wired with plumbing and electrical access points at the base of the addition that are connected to the existing home's utilities through a hole into the basement.

U.S. Pat. No. 8,925,934 discloses a torsion slide suspension has a pair of polyethylene slides on each side of the suspension that is received in slide channels on a trailer frame. The torsion slide suspension has a rubber spring on top for bearing against the trailer frame and provides suspension to support the wheels of a ground level loading trailer.

U.S. patent application publication no. 20150102568 discloses an assembly for supporting a vehicle chassis on a wheel of the vehicle includes a wheel attachment component for attaching the assembly to the wheel, a chassis attachment component for attaching the assembly to the vehicle chassis, and a suspension component. At least one adjustment element is coupled with the chassis attachment component and with a first portion of the suspension component, and is configured to shift the first portion of the suspension element between a plurality of operating positions relative to the chassis attachment component. A single strut bar is rigidly coupled with the wheel attachment component and with a second portion of the suspension component, and is configured to pivot relative to the chassis attachment component. The suspension component is configured to regulate motion transfer between the wheel attachment component and the chassis attachment component.

What is needed in the art is a vehicle trailer apparatus adapted for convenient access by persons with disabilities without the need for a complex suspension system.

SUMMARY

The present invention is adapted to provide for improved access to the inside of an enclosed trailer or on to the deck of a non-enclosed trailer especially for individuals have poor physical mobility or other applications where it is advantageous to have lowered access to the interior of an enclosed trailer or the deck of a non-enclosed trailer. Prior art trailers provide such access, if at all, only by lowering some or all of the trailer suspension using a hydraulically, mechanically, or electrically powered jacking device. The apparatus of the present invention utilizes a design of the frame/chassis to provide access while the trailer is resting and a transport mode without any such jacking device.

In one exemplary embodiment, the present invention comprises a chassis for a vehicular trailer, said chassis comprising: a pair of first and second parallel rails, each of said rails comprising a generally flat wheel engaging segment, said wheel engaging segment having a height, a generally flat hitch engaging segment, said hitch engaging segment having a height, and a linking segment, said linking segment disposed between and connecting said wheel engaging segment and said hitch engaging segment, said linking segment comprising a change in height adapted to cause said hitch engaging segment height to be offset from said wheel engaging segment height relative to a support surface; a rear cross member, said rear cross member disposed between and perpendicularly to said rails, said rear cross member having a first end fixedly connected to said wheel engaging segment of said first rail and a second end fixedly connected to said wheel engaging segment of said second rail; a front cross member, said front cross member disposed between and perpendicularly to said rails, said front cross member having a first end fixedly connected to said hitch engaging segment of said first rail and a second end fixedly connected to said hitch engaging segment of said second rail; a trailer hitch, said hitch fixedly connected to said connected to said chassis at said front cross member; and a pair of first and second wheels, wherein said first wheel has an axis of rotation and said first wheel is rotatably attached to said wheel engaging segment of said first rail, and wherein said second wheel has an axis of rotation and said second wheel is rotatably attached to said wheel engaging segment of said second rail, and wherein said axis of rotation of said first wheel is collinear with said axis of rotation of said second wheel.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only.

In the drawings:

FIG. 1 shows a side view of an exemplary trailer apparatus in accordance with the present invention in a "set" position or mode (FIG. 1A) and a "transport" position or mode (FIG. 1B).

Corresponding reference characters indicate corresponding parts throughout the several views. The exemplary embodiments set forth herein are not to be construed as limiting the scope of the invention in any manner.

DETAILED DESCRIPTION OF THE EMBODIMENTS

Figure 2:
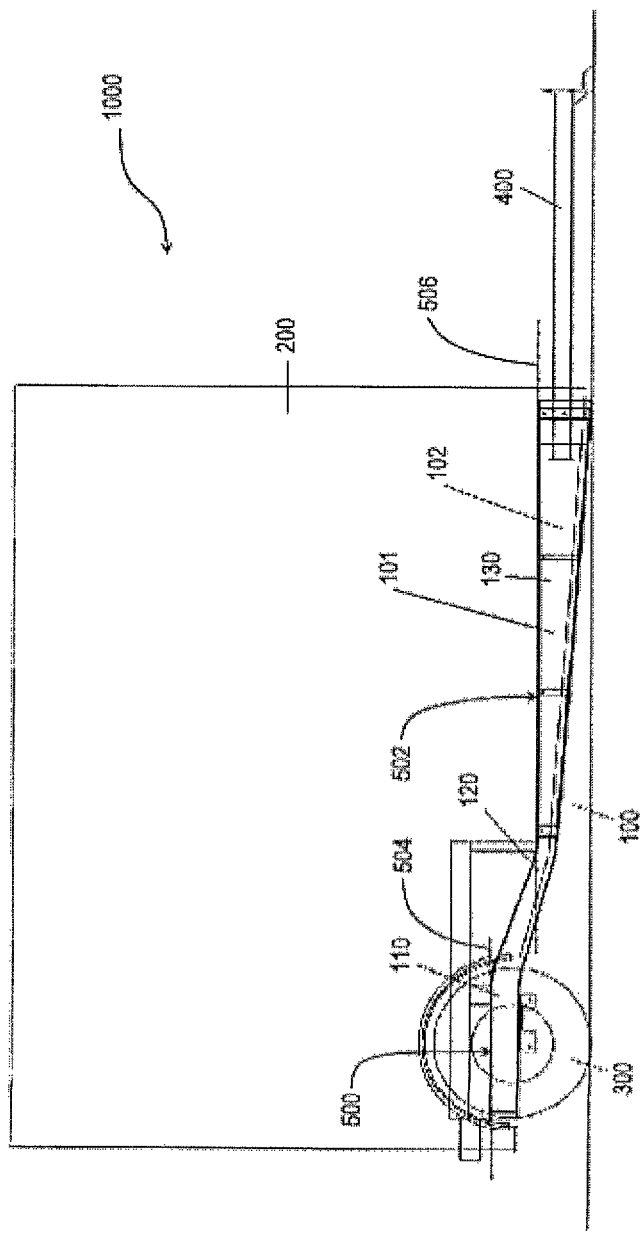
FIG. 2 shows an enlarged side view of the exemplary trailer apparatus shown in FIG. 1, in the set position or mode of FIG. 1A.

The present invention will be discussed hereinafter in detail in terms of various exemplary embodiments according to the present invention with reference to the accompanying drawings. In the following detailed description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessary obscuring of the present invention.

Thus, all of the implementations described below are exemplary implementations provided to enable persons skilled in the art to make or use the embodiments of the disclosure and are not intended to limit the scope of the disclosure, which is defined by the claims. As used herein, the word "exemplary" or "illustrative" means "serving as an example, instance, or illustration." Any implementation described herein as "exemplary" or "illustrative" is not necessarily to be construed as preferred or advantageous over other implementations. Moreover, in the present description, the ten is "upper", "lower", "left", "rear", "right", "front", "vertical", "horizontal", and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring first to FIG. 1, there is shown trailer assembly 1000 generally comprising chassis or frame 100, enclosure 200, wheels 300, and chassis hitch portion 400. Chassis 100 may comprise any suitable material for the manufacture or production of vehicle trailer chassis, including, for example, steel, aluminum, a very high strength polymer, or a composite material. Trailer apparatus 1000 in accordance with the present invention may be utilized in two modes. The first mode, shown in FIG. 1A, is referred to herein as a "set" mode, and the second mode, shown in FIG. 1B, is referred to herein as a "transport" mode. The set mode is used to provide convenient access to, egress from, and use of enclosure 200 of trailer assembly 1000 when the trailer is disconnected from a tow vehicle (not shown) and parked. The transport mode is used for towing trailer assembly 1000 over a support surface such as a roadway, with a tow vehicle to which the trailer assembly is selectively connected through its hitch portion 400 in a manner known in the art, such as through a ball hitch or pintle hitch for example.

In certain embodiments, once enclosure 200 is fully loaded or fully accessed by a person, including a person who may or may not have disabilities, hitch 400 is then connected to the tow vehicle, and placed in its transport mode for towing.

The embodiments of trailer apparatus 1000 herein depicted each generally comprises chassis 100 and enclosure 200 disposed on top of and connected to chassis 100, as shown in FIGS. 1, 2, 7 and 9. Enclosure 200 may comprise an actual enclosure or an open air carrying apparatus. Enclosure 200 may further comprise various doors 250 (FIGS. 7 and 9) or other access portals. Preferably, enclosure 200 comprises an access portal (not shown) near hitch portion 400 such that enclosure 200 is accessible by differently abled persons. Additionally, enclosure 200 may comprise any known materials suitable for constructing an enclosure or open air trailer bed, including aluminum, wood, steel, plastic, fiberglass, and composite material.

Figure 3:
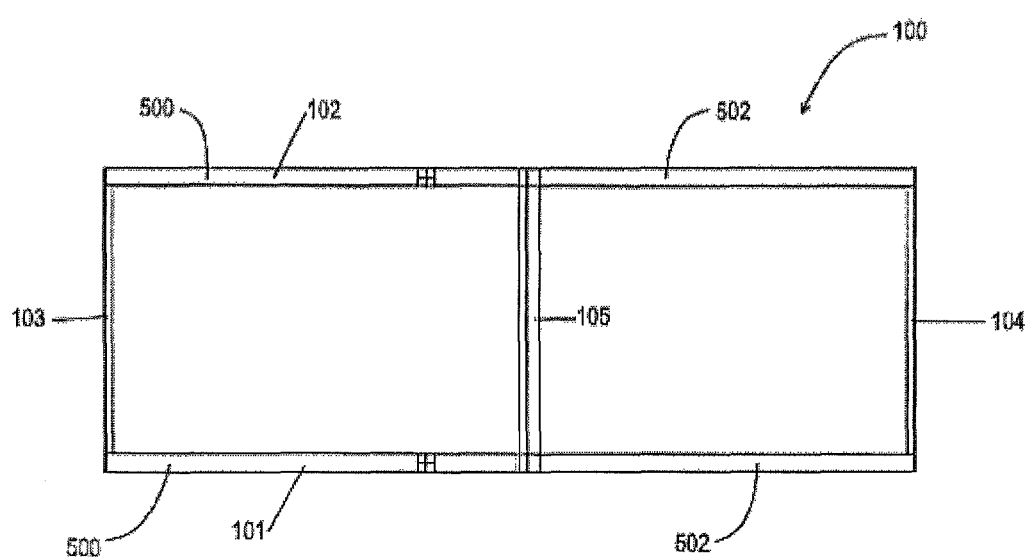
FIG. 3 shows a top plan view of the chassis of the trailer apparatus shown in FIG. 1, without its hitch portion.
Figure 4:
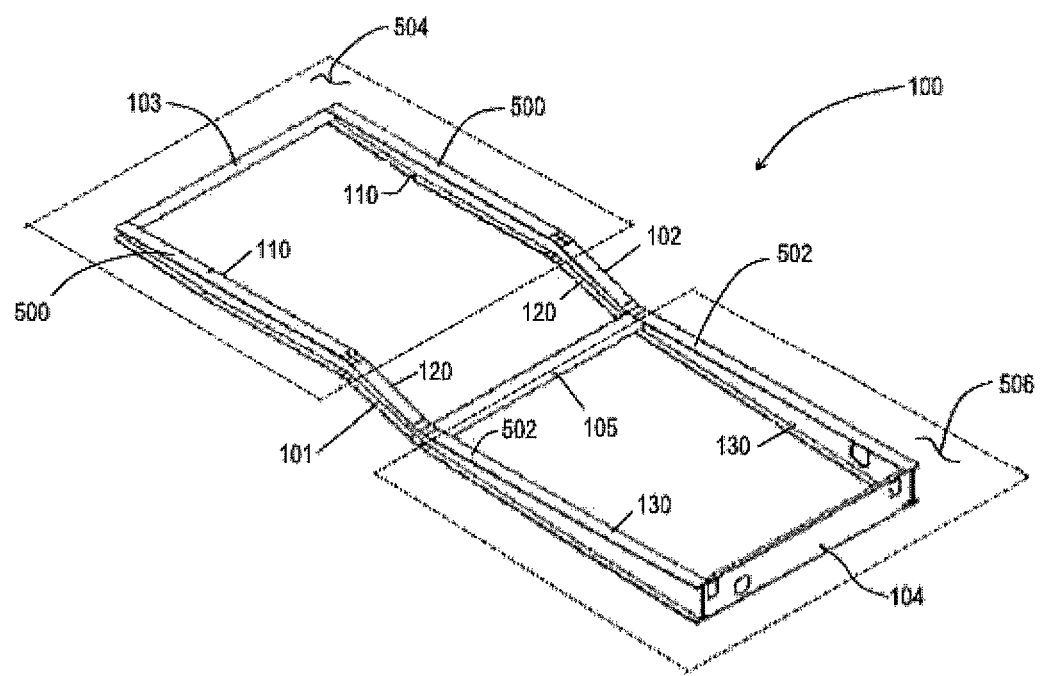
FIG. 4 shows a top perspective view of the chassis shown in FIG. 3.
Figure 5:
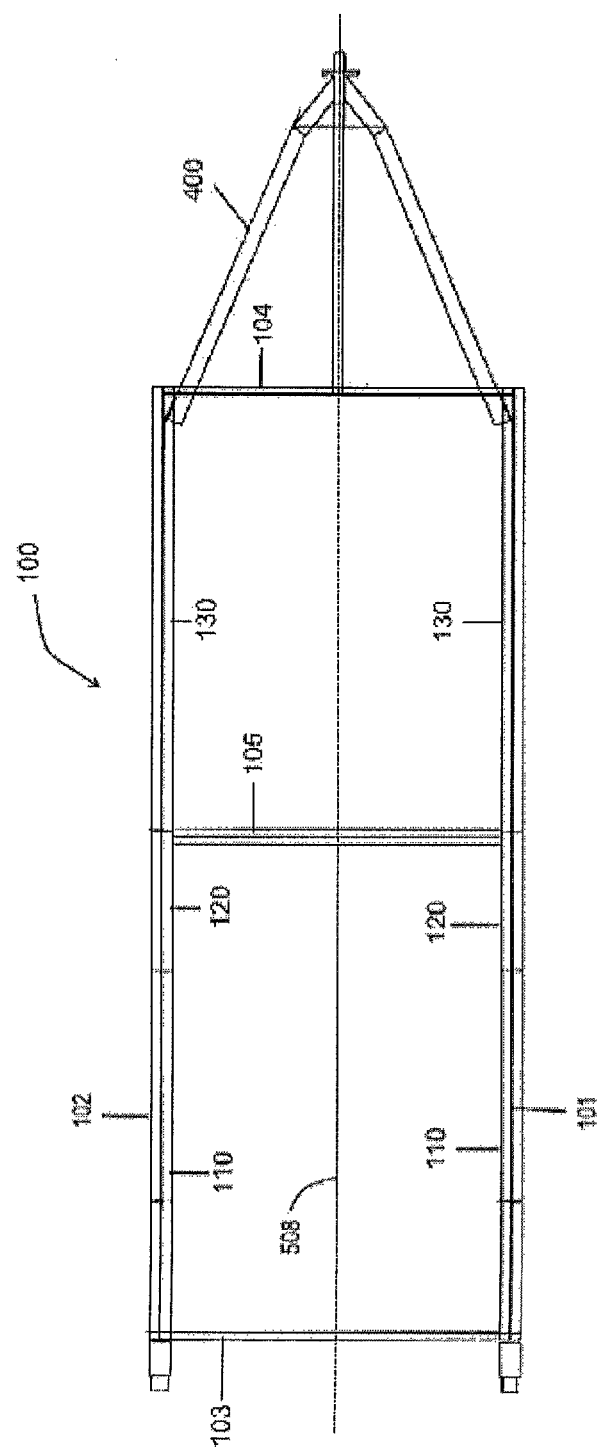
FIG. 5 shows a top plan view of the chassis of the trailer apparatus shown in FIG. 1, including its attached hitch portion.
Figure 7:
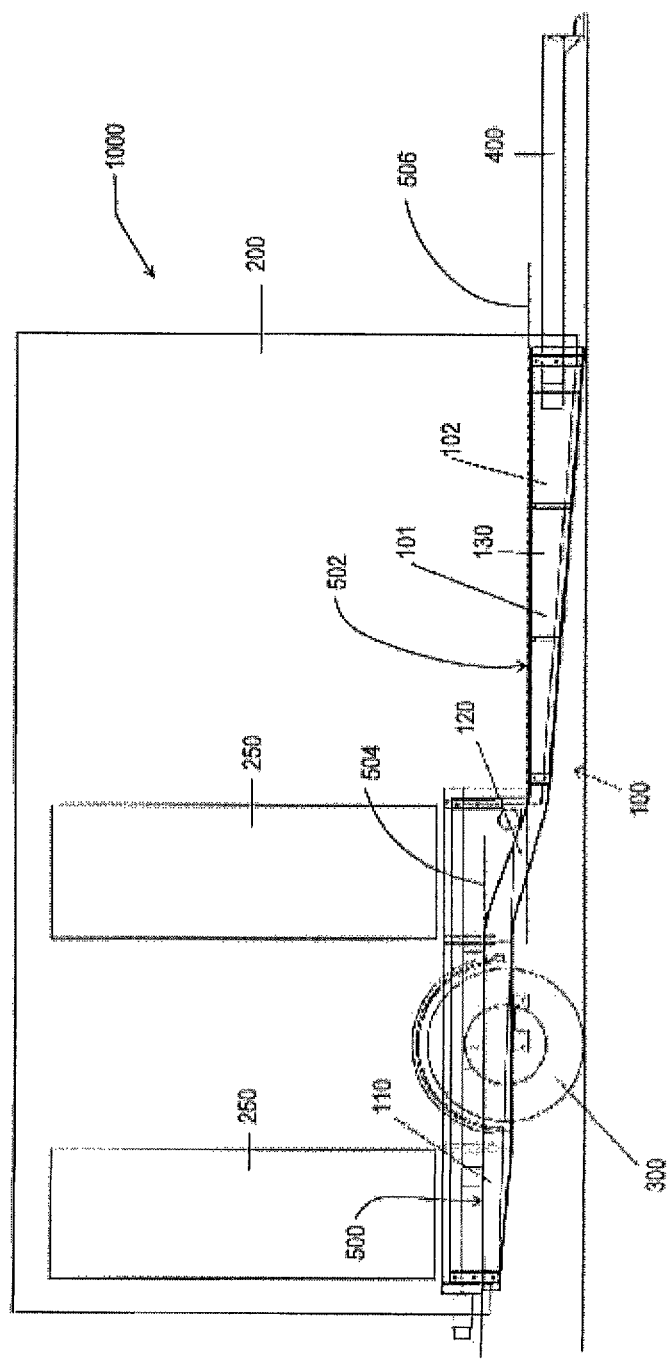
FIG. 7 shows a side view of an alternative exemplary embodiment of a trailer apparatus in accordance with the present invention in the set position or mode.
Figure 9:
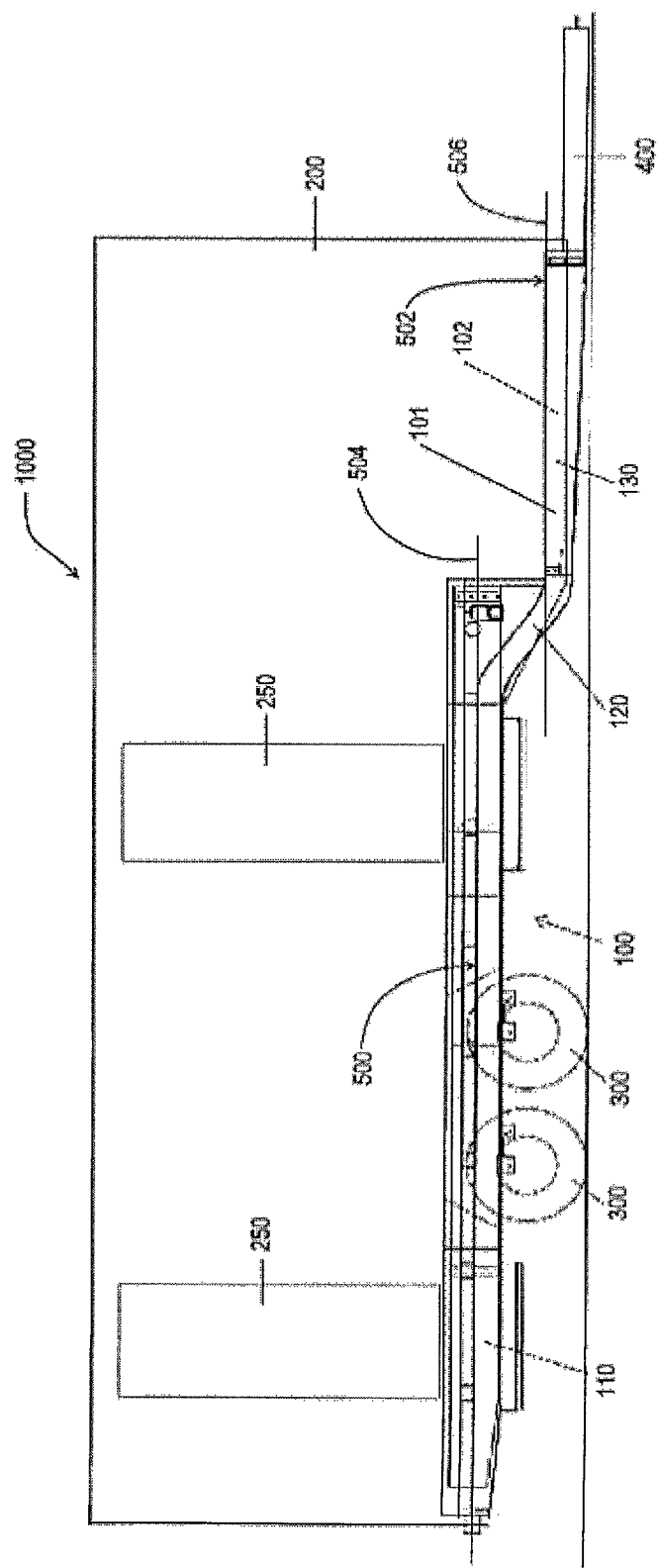
FIG. 9 shows a side view of yet another alternative exemplary embodiment of a trailer apparatus in accordance with the present invention in the set position or mode.

FIGS. 3, 4 and 5 respectively show a top plan view and a top perspective view of chassis 100 of the embodiment of trailer apparatus 1000 shown in FIGS. 1 and 2 though, as shown in FIGS. 7 and 9, chassis 100 of alternative embodiments of trailer apparatus 1000 may be structured similarly. In each depicted embodiment, chassis 100 of comprises parallel first rail 101 and second rail 102. Chassis 100 further comprises a first cross member 103 and a second cross member 104 substantially parallel with first cross member 103. Chassis 100 may further comprise third cross member 105 intermediate and parallel with first and second cross members 103, 104 at a generally centralized location therebetween.

Figure 6:
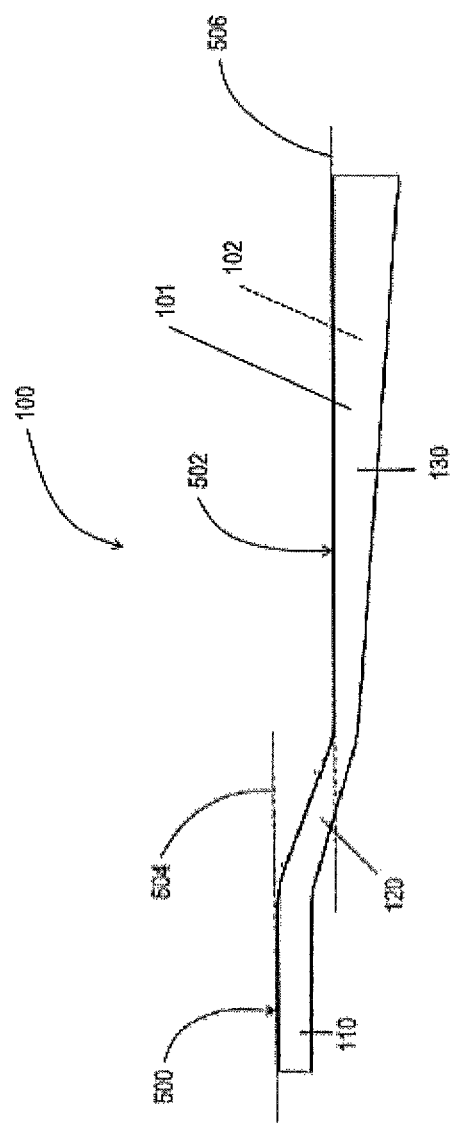
FIG. 6 shows a side view of the chassis shown in FIGS. 3 and 4.
Figure 8:
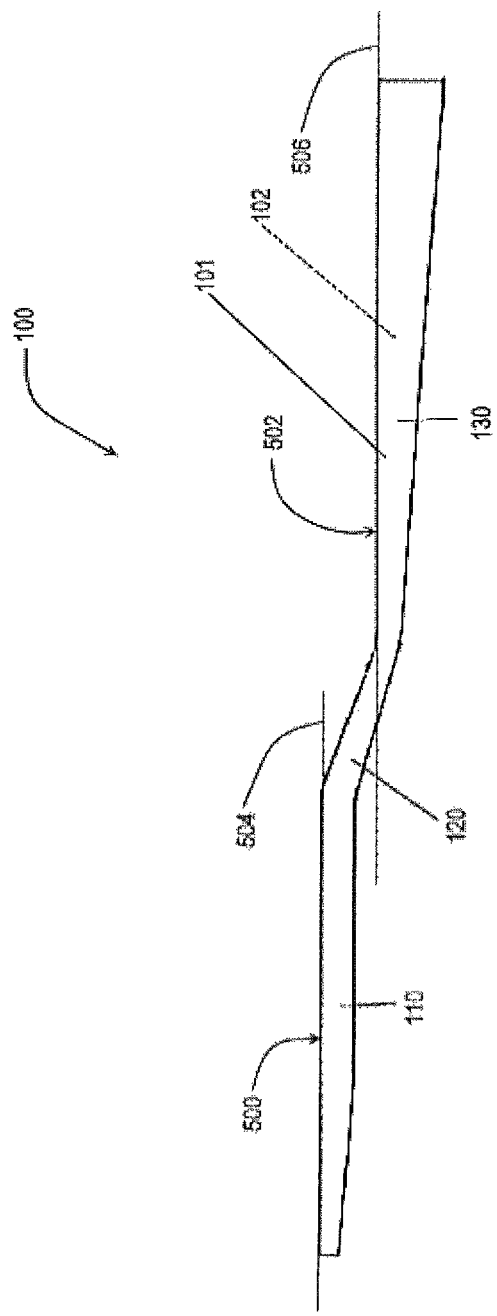
FIG. 8 shows a side view of the chassis of the trailer apparatus shown in FIG. 7 without its hitch portion.
Figure 10:
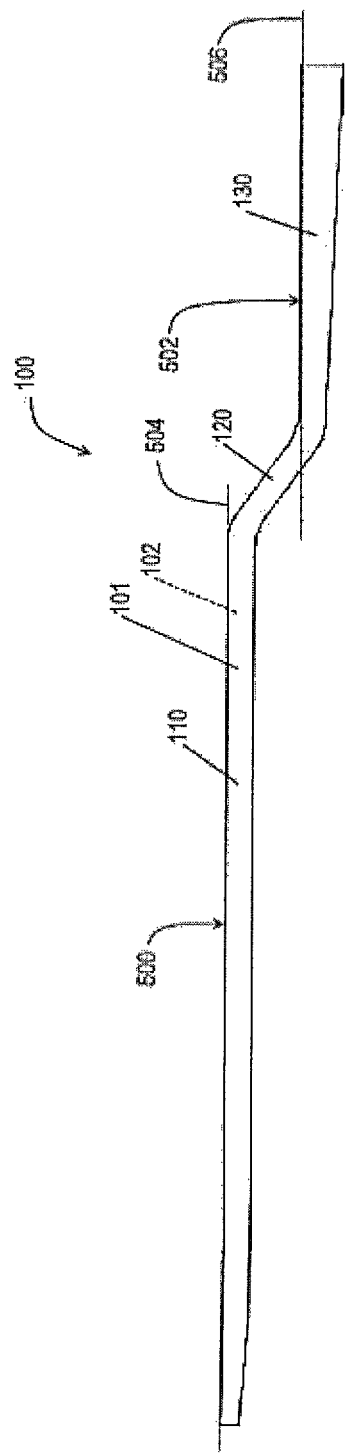
FIG. 10 shows a side view of the chassis of the trailer apparatus shown in FIG. 9 without its hitch portion.

Each cross member 103, 104, 105 is disposed between and extends perpendicularly to rails 101 and 102. Each cross member 103, 104, 105 has opposing ends that are fixedly connected to rails 101 and 102. Each rail 101 and 102 of chassis 100 generally comprises a wheel engaging segment 110, a linking segment 120, and a hitch engaging segment 130. A comparison of the trailer apparatus 1000 embodiments shown in FIGS. 2, 7 and 9, and the associated side views of their respective chassis 100 shown (without their hitch portions 400) in FIGS. 6, 8 and 10, shows that their wheel engaging segments 110 are of substantially differing lengths. In each embodiment of chassis 100, however, the respective linking segment 120 of each rail 101, 102 is adapted to extend between and connect the rail's wheel engaging segment 110 and hitch engaging segment 130.

In each depicted embodiment of chassis 100, the opposing ends of rearmost, first cross member 103 are respectively fixedly connected to rails 101 and 102 generally at the wheel engaging segments 110 of the rails. Additionally, the opposing ends of frontmost, second cross member 104 are respectively fixedly connected to rails 101 and 102 generally at the hitch engaging segments 130 of the rails. If desired, the opposing ends of centralized, third cross member 105 can be respectively fixedly connected to rails 101 and 102 generally at the linking segments 120 of the rails.

As illustrated in FIG. 5, the various embodiments of chassis 100 may include conventional trailer hitch portion 400. Hitch portion 400 is generally fixedly connected to the rails 101, 102 of chassis 100 generally at the location of frontmost, second cross member 104.

Referring now to FIGS. 3, 4, 6, 8 and 10, the top surface 500 of the wheel engaging segment 110 and the top surface 502 of the hitch engaging segment 130, of each rail 101 and 102 of the depicted embodiments of chassis 100 are substantially parallel with each other. In chassis 100, the parallel wheel engaging segment top surfaces 500 of rails 101 and 102 define a first imaginary plane 504; and the parallel hitch engaging segment top surfaces 502 of rails 101 and 102 define a second imaginary plane 506. Imaginary planes 504 and 506 are parallel and spaced in directions normal thereto.

As shown in FIGS. 1A, 2, 7 and 9, in the set mode or position of trailer apparatus 1000, imaginary planes 504 and 506 are substantially horizontal. Hence, one having ordinary skill in the art will recognize that, relative to the support surface (e.g., the ground or pavement) on which trailer apparatus 1000 rests, a floor may be disposed above hitch engaging section top surfaces 502 of rails 101 and 102 at a height less than that of a floor disposed above wheel engaging section top surfaces 500 of rails 101 and 102, and thus provide easier access to and egress from the forward portion of the interior of trailer apparatus enclosure 200, relative to the aft portion of enclosure 200 and/or prior trailer apparatuses; the benefit, particularly to individuals with certain physical disabilities, of a floor that is horizontally level and of relatively lower height is readily apparent.

As exemplified by the embodiment shown in FIG. 1B, in moving trailer apparatus 1000 from its set mode to its transport mode, chassis 100 is pivoted in a vertically and longitudinally-oriented imaginary plane 508 (FIG. 5) that is perpendicular to imaginary planes 504 and 506. Consequently, imaginary planes 504 and 506 and a trailer floor(s) parallel thereto are tilted out of a substantially horizontal orientation and become inclined longitudinally from rearmost, first cross member 103 towards frontmost, second cross member 104, as will be recognized by one having ordinary skill in the relevant art through comparison of FIGS. 1A and 1B.

Each wheel engaging segment 110 is adapted to rotatably connect to one or more wheels 300. Referring again to FIGS. 2, 7 and 9, those of ordinary skill in the art will appreciate that wheel engaging segments 110 of chassis 100 may be rotatably connected to one or more wheels 300 by any conventional means including a single axle defining an axis that runs extending through a pair of laterally opposite wheels (FIGS. 2 and 7), a tandem axle defining a pair of parallel axes extending through two pairs of laterally opposite wheels (FIG. 9), or a plurality of rotatable connections by which each wheel has its own rotatable connection to chassis 100. Moreover, such connections may be connected to a prime mover including an electric motor, an internal combustion engine, or the like. Those of ordinary skill in the art will further appreciate that any number of wheels or any type of prime mover may be used within the scope of the present invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A chassis for a vehicular trailer, said chassis comprising:
   parallel first and second rails, each of said rails comprising a generally flat wheel engaging segment, said wheel engaging segment having a height, a generally flat hitch engaging segment, said hitch engaging segment having a height, and a linking segment, said linking segment disposed between and connecting said wheel engaging segment and said hitch engaging segment, said linking segment comprising a change in height adapted to cause said hitch engaging segment height to be offset from said wheel engaging segment height relative to a support surface upon which said chassis rests;
   a first cross member, said first cross member disposed between and extending perpendicularly to said rails, said first cross member having a first end fixedly connected to said wheel engaging segment of said first rail and a second end fixedly connected to said wheel engaging segment of said second rail;
   a second cross member, said second cross member disposed between and extending perpendicularly to said rails, said second cross member having a first end fixedly connected to said hitch engaging segment of said first rail and a second end fixedly connected to said hitch engaging segment of said second rail;
   a hitch portion, said hitch portion fixedly connected to said chassis at said second cross member; and
   a first wheel and a second wheel, wherein said first wheel has an axis of rotation and said first wheel is rotatably attached to said wheel engaging segment of said first rail, and wherein said second wheel has an axis of rotation and said second wheel is rotatably attached to said wheel engaging segment of said second rail, and wherein said axis of rotation of said first wheel is collinear with said axis of rotation of said second wheel;
   wherein said chassis has a set mode in which said chassis is not configured to be towed and a floor of the vehicular trailer located above said hitch engaging segments of said first and second rails is substantially level horizontally and at a height lower than said wheel engaging segment height; and
   wherein said chassis has a transport mode in which the floor of the vehicular trailer is inclined in a longitudinal direction that extends from said first cross member toward said second cross member and in which said chassis is configured for being towed by a vehicle coupled to said hitch portion.

2. A vehicular trailer, said trailer comprising:
   a chassis, said chassis comprising parallel of first and second rails, each of said rails comprising a generally flat wheel engaging segment, said wheel engaging segment having a height, a generally flat hitch engaging segment, said hitch engaging segment having a height, and a linking segment, said linking segment disposed between and connecting said wheel engaging segment and said hitch engaging segment, said linking segment comprising a change in height adapted to cause said hitch engaging segment height to be offset from said wheel engaging segment height relative to a support surface upon which said trailer rests;
   a first cross member, said first cross member disposed between and perpendicularly to said rails, said first cross member having a first end fixedly connected to said wheel engaging segment of said first rail and a second end fixedly connected to said wheel engaging segment of said second rail;
   a second cross member, said second cross member disposed between and perpendicularly to said rails, said second cross member having a first end fixedly connected to said hitch engaging segment of said first rail and a second end fixedly connected to said hitch engaging segment of said second rail;
   a hitch, said hitch fixedly connected to said chassis at said second cross member;
   a pair of first and second wheels, wherein said first wheel has an axis of rotation and said first wheel is rotatably attached to said wheel engaging segment of said first rail, and wherein said second wheel has an axis of rotation and said second wheel is rotatably attached to said wheel engaging segment of said second rail, and wherein said axis of rotation of said first wheel is collinear with said axis of rotation of said second wheel;
   a floor; and
   an enclosure, said enclosure disposed on top of and fixedly connected to said chassis;
   wherein said trailer has a set mode in which said trailer is not configured to be towed and said floor is located above said hitch engaging segments of said first and second rails and is substantially level horizontally and at a height lower than said wheel engaging segment height; and
   wherein said trailer has a transport mode in which said floor is inclined in a longitudinal direction that extends from said first cross member toward said second cross member and in which said trailer is configured for being towed by a vehicle coupled to said hitch portion.

\* \* \* \* \*